United States Patent [19]
Soot

[11] Patent Number: 6,016,901
[45] Date of Patent: Jan. 25, 2000

[54] CHAINED MOVABLE PLATFORMS FOR PEOPLE AND OBJECTS

[76] Inventor: Olaf Soot, 9 Tomahawk La., Greenwich, Conn. 06830

[21] Appl. No.: 08/790,748

[22] Filed: Jan. 27, 1997

[51] Int. Cl.[7] .................................................. B65G 17/06
[52] U.S. Cl. ............................................................ 198/321
[58] Field of Search .................................. 198/321, 326, 198/333, 853; 472/36, 43

[56] References Cited

U.S. PATENT DOCUMENTS

| | | | |
|---|---|---|---|
| 1,351,658 | 8/1920 | Johnson | 198/321 X |
| 3,498,445 | 3/1970 | Piper | 198/321 X |
| 5,042,648 | 8/1991 | Garvey | 198/321 X |
| 5,201,407 | 4/1993 | Proske | 198/853 X |

FOREIGN PATENT DOCUMENTS

| | | | |
|---|---|---|---|
| 2230753 | 10/1990 | United Kingdom | 198/321 |

*Primary Examiner*—James R. Bidwell

[57] ABSTRACT

Apparatus for moving seated or standing people or objects in a closed path in which the closed path may be other than circular. The apparatus comprises a chain of movable platforms arranged in a closed loop free-form geometrical arrangement and arranged to travel above or below a stationary floor surface. By providing tables and chairs on each platform, one or more diners can be seated at each of the tables and thus will be enabled to view a changing surrounding view while immobile at the table on the moving platform. Preferably, the platforms are constructed on supporting chassis in the form of wheeled vehicles each pivotable about a pivot on an adjacent platform chassis. Each chassis may comprise a cross member positioned generally perpendicular to the direction of travel and rigidly connected to a tie member extending generally perpendicular to the cross member. The tie member preferably forms part of the drive for the chained platforms.

30 Claims, 12 Drawing Sheets

CHAINED MOVABLE PLATFORMS FOR PEOPLE AND OBJECTS

This invention is based on Disclosure Document No. 382807, filed Oct. 6, 1995.

The invention is directed to a chain of movable platforms, and in particular to apparatus to enable people and/or objects to be transported on platforms along a predetermined curved or straight path in a facility such as a restaurant or the like.

BACKGROUND OF INVENTION

There exist facilities in which it is desirable to be able to transport people and/or objects on platforms along a predetermined curved or straight path. One example is a restaurant. Rotating restaurants are common in tall buildings with interesting views. They are typically constructed on circular turntables that rotate slowly, say, one revolution per hour (rph), while dining guests seated at turntable-mounted tables adjacent windows can enjoy the changing panoramic view. Disadvantages are that the building or dining area has to be round, otherwise the guests on the circular turntable would not remain close to the windows through most of the turntable rotational travel.

SUMMARY OF INVENTION

A principal object of the invention is a facility such as a restaurant or the like in which people and/or objects can be caused to follow a path that can be selected and designed to suit the geometry of space and/or environment.

Another object of the invention is apparatus for moving seated or standing people in a closed path adjacent to a changing viewing area in which the closed path is other than circular.

Still another object of the invention is apparatus supporting people and providing optimum views of fixed surroundings while the people are transported over an irregular closed path.

These and other objects are achieved in accordance with one feature of the invention by providing a chain of movable platforms each capable of supporting people and/or objects while the chain of movable platforms is caused to follow a desired path.

In accordance with another feature of the invention, the chained platforms are arranged in a closed loop free-form geometrical arrangement arranged to travel above or below a stationary floor surface.

The construction of the invention provides a closed chain of discrete platforms chained together in a manner to allow them each to follow one behind the other along a predetermined path which can be laid out to follow the irregular shape of a containing building or other facility. In a preferred embodiment, by providing tables and chairs on each platform, one or more diners can be seated at each of the tables and thus will be enabled to view through adjacent windows a changing surrounding view while immobile at the table on the moving platform.

Preferably, the platforms are constructed as floors installed on chassis in the form of trucks or wheeled vehicles each pivotable about a pivot on an adjacent chassis. Preferably, each chassis comprises a cross member positioned generally perpendicular to the direction of travel and rigidly connected to a tie member extending generally perpendicular to the cross member. The tie member preferably forms part of the drive means for the chained platforms.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, like reference numerals or letters signifying the same or similar components.

DETAILED DESCRIPTION OF PREFERRED EMBODIMENTS

The method and apparatus of this invention enables people and/or objects to be transported on chained platforms along a predetermined curved or straight path in a restaurant or other facilities, which path can be selected and designed to suit the geometry of space and/or environment so as to provide optimum views of the surroundings to the people on the chain of movable platforms. It will be appreciated that the method and apparatus of the invention described herein are not limited to movable restaurant configurations, though that environment provides a particularly good example to illustrate the unusual flexibility and other benefits available with the construction of the invention. It will be readily appreciated by those skilled in this art that the construction of the invention can also be employed for viewing exhibits, viewing theme parks, and for other kinds of environments involving people movers, and is also useful for moving of displays and/or scenic elements past stationary audiences, and for other similar purposes.

Figure 1:
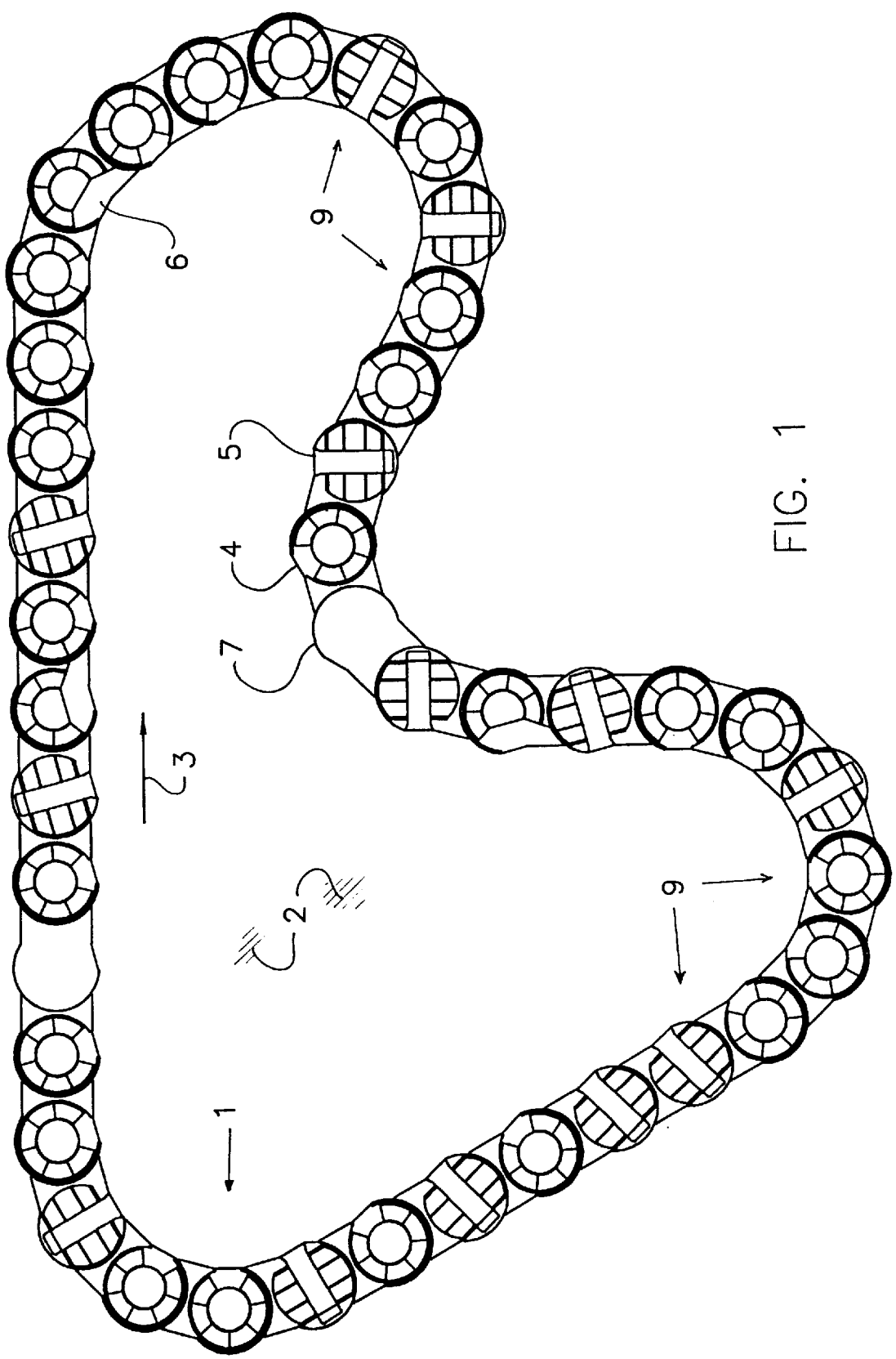
FIG. 1 is a plan view of one form in accordance with the invention of a chain of movable platforms in a free-form geometrical arrangement for use, for example, in a restaurant environment.

FIG. 1 shows one form of chain 1 of movable platforms 9 according to the invention traveling above a stationary floor surface 2 in the direction indicated by arrow 3, in a closed loop free-form geometrical arrangement. Many closed loop geometrical arrangements, such as rectangular, triangular, etc., including round, are possible. The configuration shown in FIG. 1 for the preferred embodiment to be described is a restaurant with booths installed on the movable platforms 9 comprising six person booths 4, four person booths 5, wheelchair access booths 6, and crossover platforms 7, enabling people to pass over the chained platforms. Other configurations for movable displays, transporting guests through theme park attractions, etc., are also possible.

Figure 2:
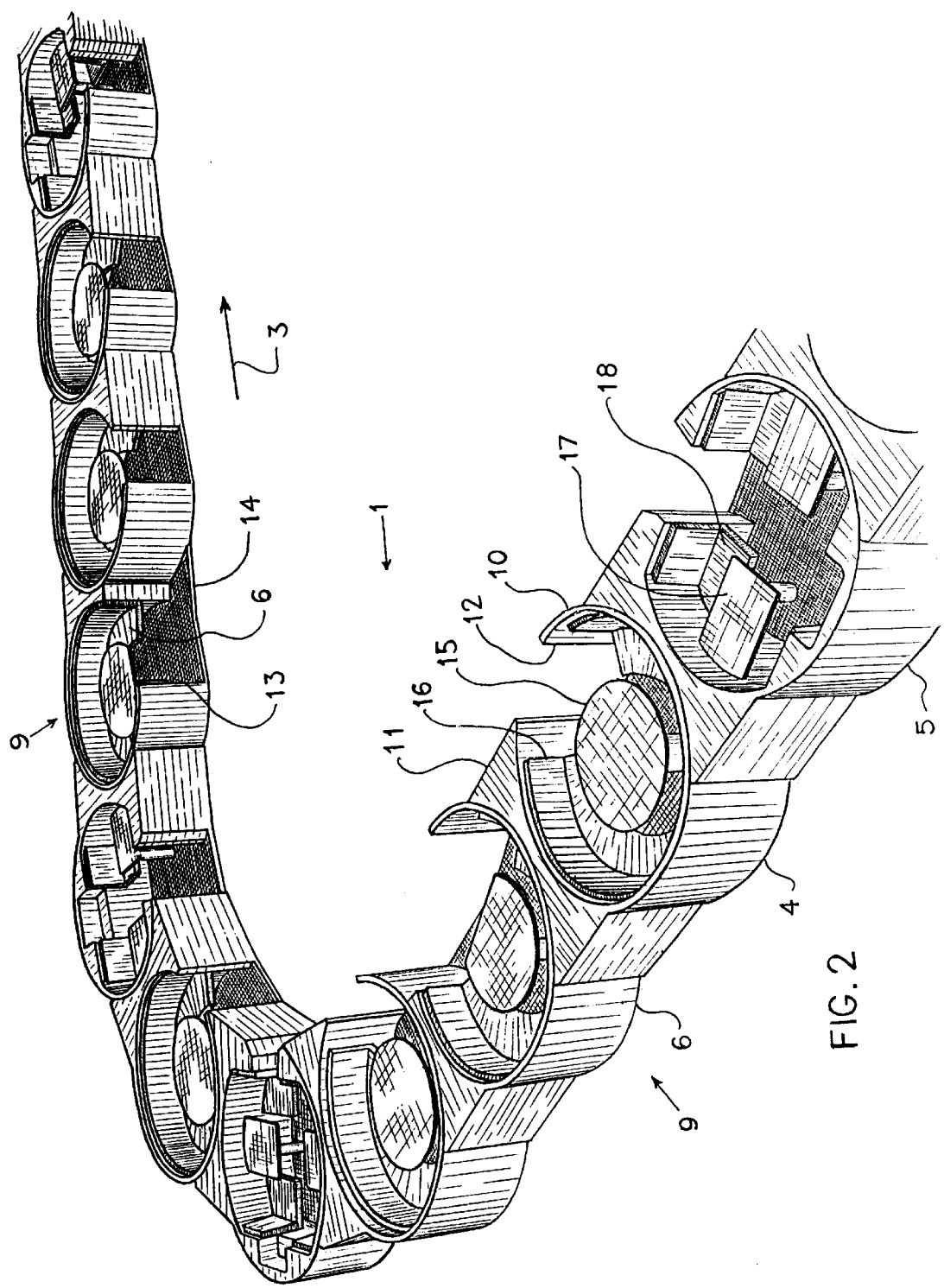
FIG. 2 is a partial perspective view of the chain of movable platforms shown in FIG. 1.

FIG. 2 is a perspective view of part of one form of the chain 1 of movable platforms 9 for traveling along curved and straight paths in the direction indicated by arrow 3. A six-person booth configuration 4 is shown mounted on a platform 9 with table 15 and seat 16. A four-person booth configuration 5 is shown mounted on a platform 9 with tables 17 and seats 18. A wheelchair access booth configuration 6 is shown mounted on a platform 9 with shallow floor and with beveled edge 14 for easy wheelchair access.

Figure 3:
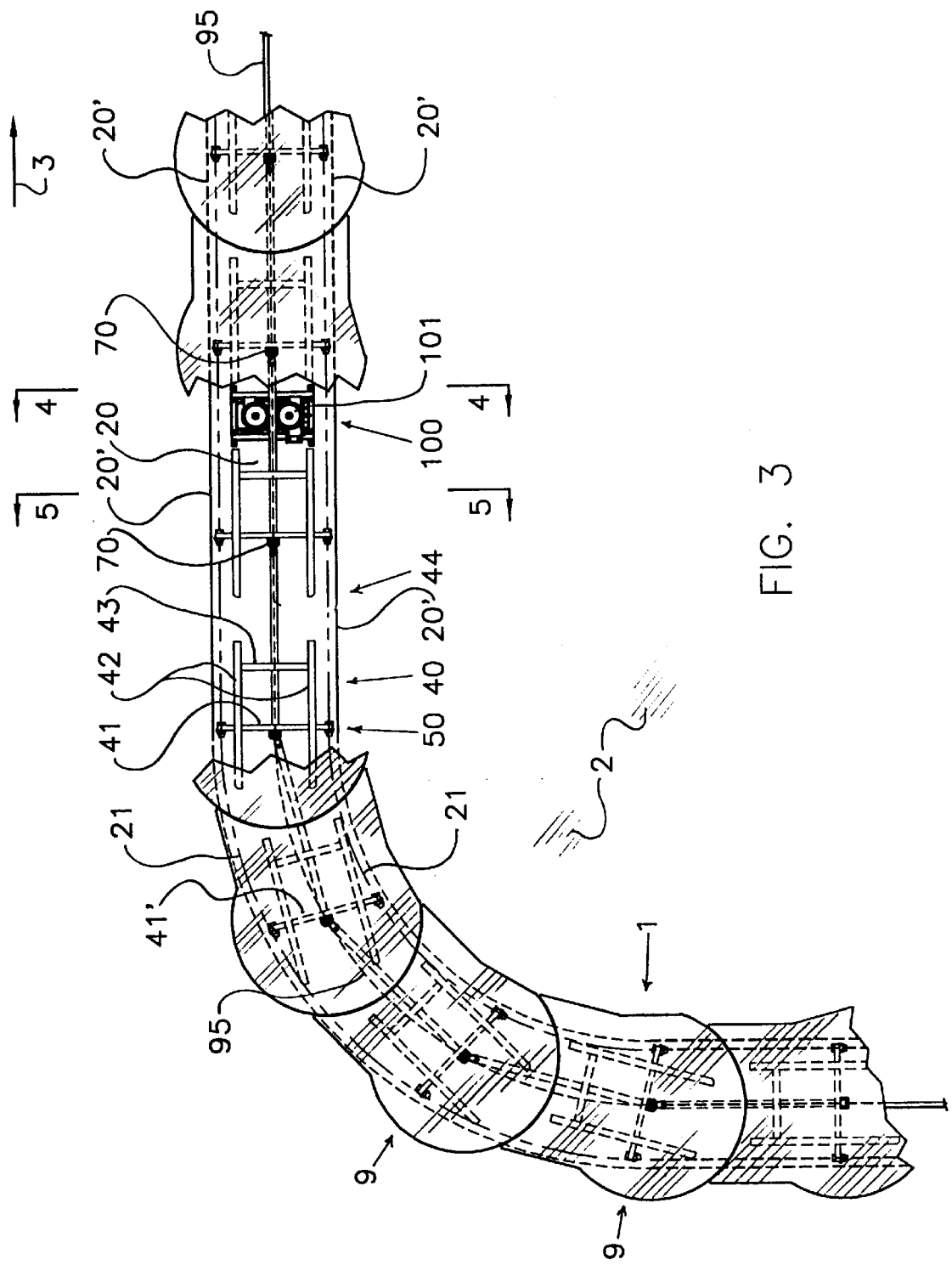
FIG. 3 is a partial plan view with a partial cut-away area of the chain of movable platforms of FIG. 1 illustrating the means for supporting, guiding and driving the chain of movable platforms.
Figure 6:
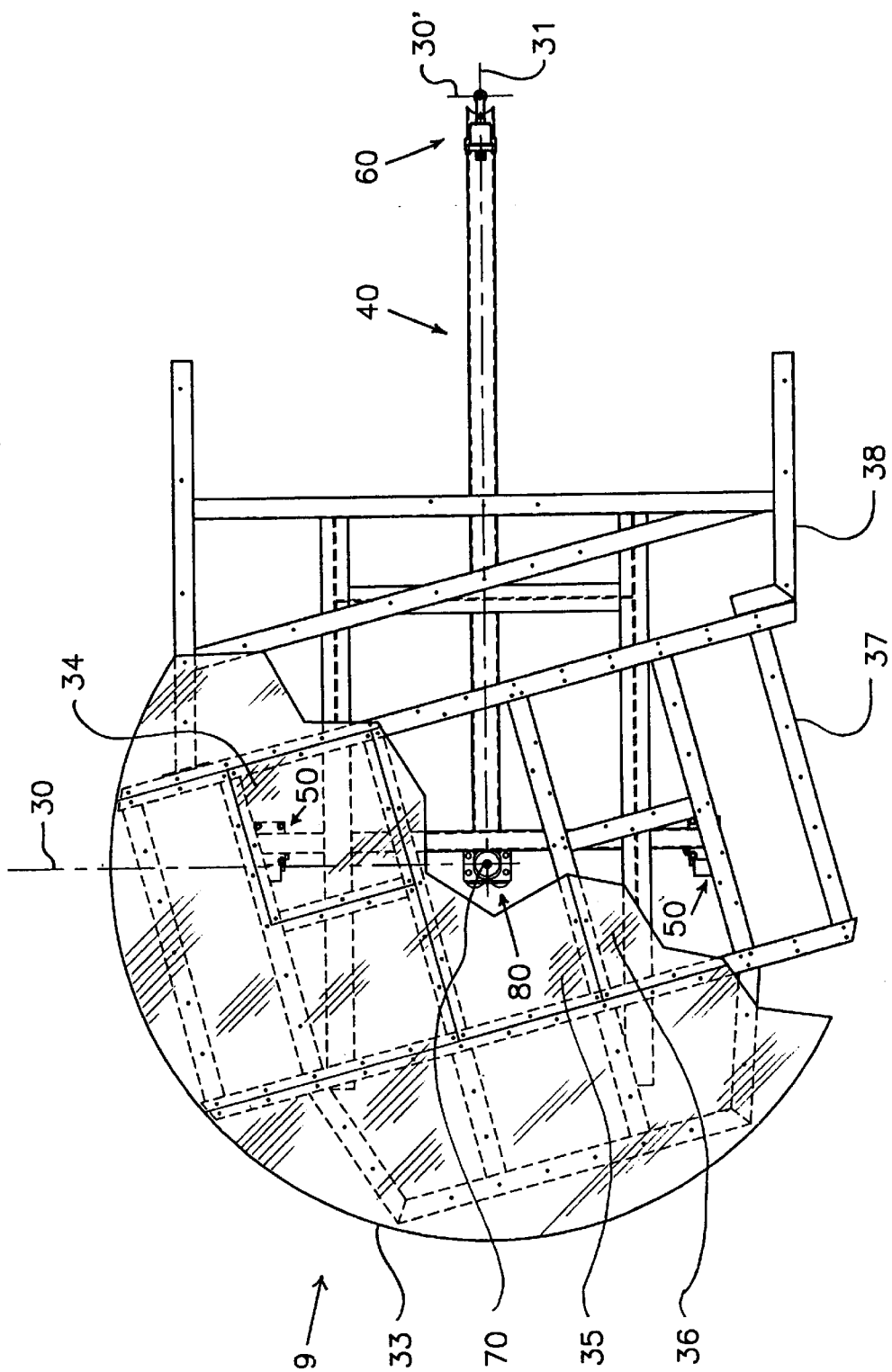
FIG. 6 is a fragmentary plan view of one form of movable platform of the chain of FIG. 1 showing one form of floor, floor frame and chassis construction.

In the restaurant configuration shown, each platform 9 is surrounded by side walls consisting of circular portions 10 and a downstream nesting end portion 11. Each circular portion 10 can therefore rotate with respect to the upstream end portion 11 affixed to the upstream platform 9. This is required because when the platforms 9 in the chain 1 move from the straight to curved portions (or from curved to straight portions) of the path or track, guided by guide member 95 (FIG. 3), the platforms 9 with booths rotate with respect to each other about their center pivot pins 70 (FIGS. 3, 6, 9) located at the intersection of lines 30, 30' and 31, as shown in FIG. 6. The interfacing nesting wall end portion 11, as shown on FIG. 2, are designed to match the adjacent wall circular portions 10 and must be sufficiently close to the latter and sufficiently extended around the circle so as to eliminate shear and pinch edges between adjacent booths. If this condition were not satisfied, where, for example, the spacing between the adjacent circular and nesting wall portions were too large or if the curved nesting surface of portion 11 were too narrow (not sufficiently extended), as the platforms rotate when entering or exiting from a curved portion of the path, possible wedge or trapezoidal shaped spaces could form between the nesting surfaces that could catch or trap a human being or part of a human being in the vicinity with consequential harm resulting. The extent of the curved sections depends upon the size of the booths. For the typical booth as illustrated, the nesting portion of the section 11 is about 8 feet wide, designed so as to cover a trench 20 below as shown in FIG. 3 along all portions of the travel. The width can be reduced to about 2.5 feet which still would prevent a person from getting caught in the space, but in this case the floor 33 should be, say, approximately 8 feet wide to cover the open slot between the edge of the flooring and the side of the chassis. As will be observed from FIGS. 3 and 4, the edge of the flooring extending over the trench 20 has been designated 20'. The platforms are configured sufficiently wide such that in any position, whether over a curved or straight track portion, the slot between the edges 20' of the flooring and the adjacent sides of the chassis 40 is always covered by platform 9.

As shown in FIG. 2, the booth entrances 12 are located so as not to be blocked by the adjacent wall nesting end portions 11 on the straight or curved portion of the travel, when the platforms rotate with respect to each other about their center pivot 70 (FIG. 3) while transitioning from straight line travel to curved line travel. The entrance 13 to the wheelchair booth 6 is made wider than the others for easy access.

FIG. 3 is a partial plan and partial cutaway view of the chain 1 of movable platforms 9. As shown in this figure and in FIGS. 4 and 5, the platforms 9 are each mounted on a chassis 40 which in turn is installed within the trench 20 and is supported by swivel casters assemblies 50. The swivel casters assemblies 50 can roll along lines 21 of the trench (FIG. 3) on the floor surface (or on tracks not shown) as required for interfacing conditions. The closed loop of chained platforms is preferably driven by a traction drive 100 engaging a drive tube 44 mounted beneath each chassis 40. Each chassis 40 is also supported at the outer end of its drive tube 44 by pivotally connecting its pivot assembly 60, also referred to herein as a rod eye assembly 60, to the chassis pivot pin 70 of the adjacent chassis (see FIGS. 9 and 10 for details below). Thus, a stable support is provided for each platform and a continuous closed loop 1 is formed with each chassis 40 supported on, preferably, three points (for example 2 wheels and a pivot). The pivot bearings 60 are preferably spherical, so as to permit relative tilt of the adjacent platforms 9 due to possible floor or track irregularities, without imposing undue stresses on the chassis 40 and platforms 9.

Figure 5:
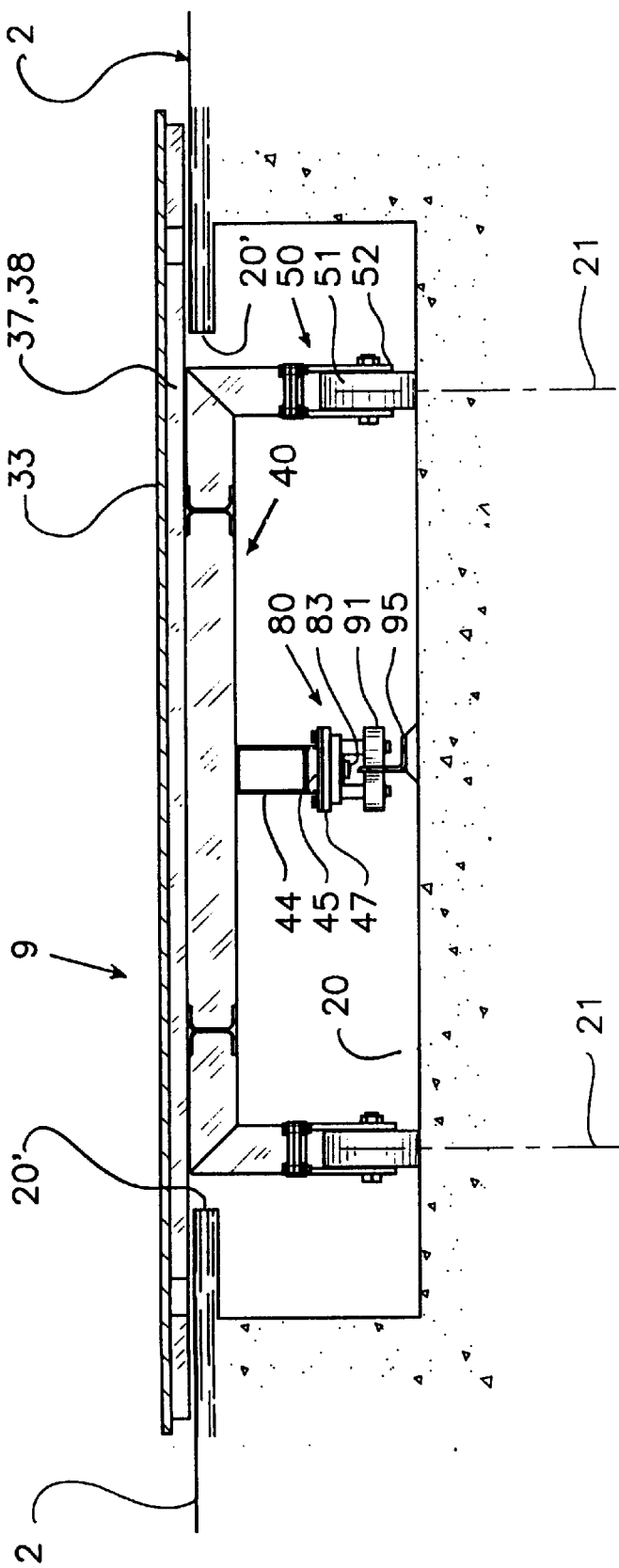
FIG. 5 is a cross-sectional view of the chain of movable platforms taken along the line 5—5 of FIG. 3, illustrating means for supporting and guiding the platforms.
Figure 9:
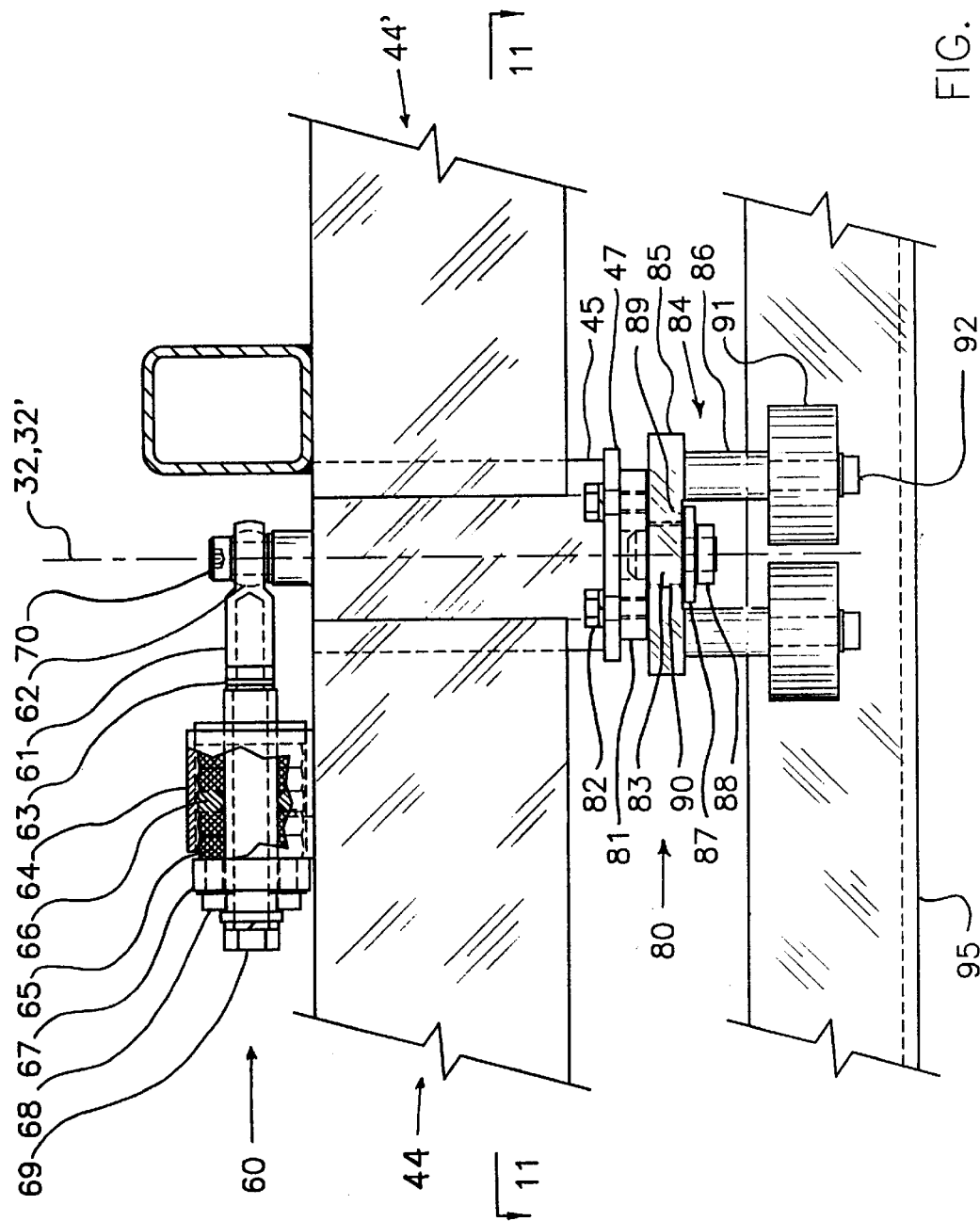
FIG. 9 is a detailed side view of part of the platform chassis shown in FIG. 8 showing one form of connection between the adjacent platform chassis and guiding means.
Figure 11:
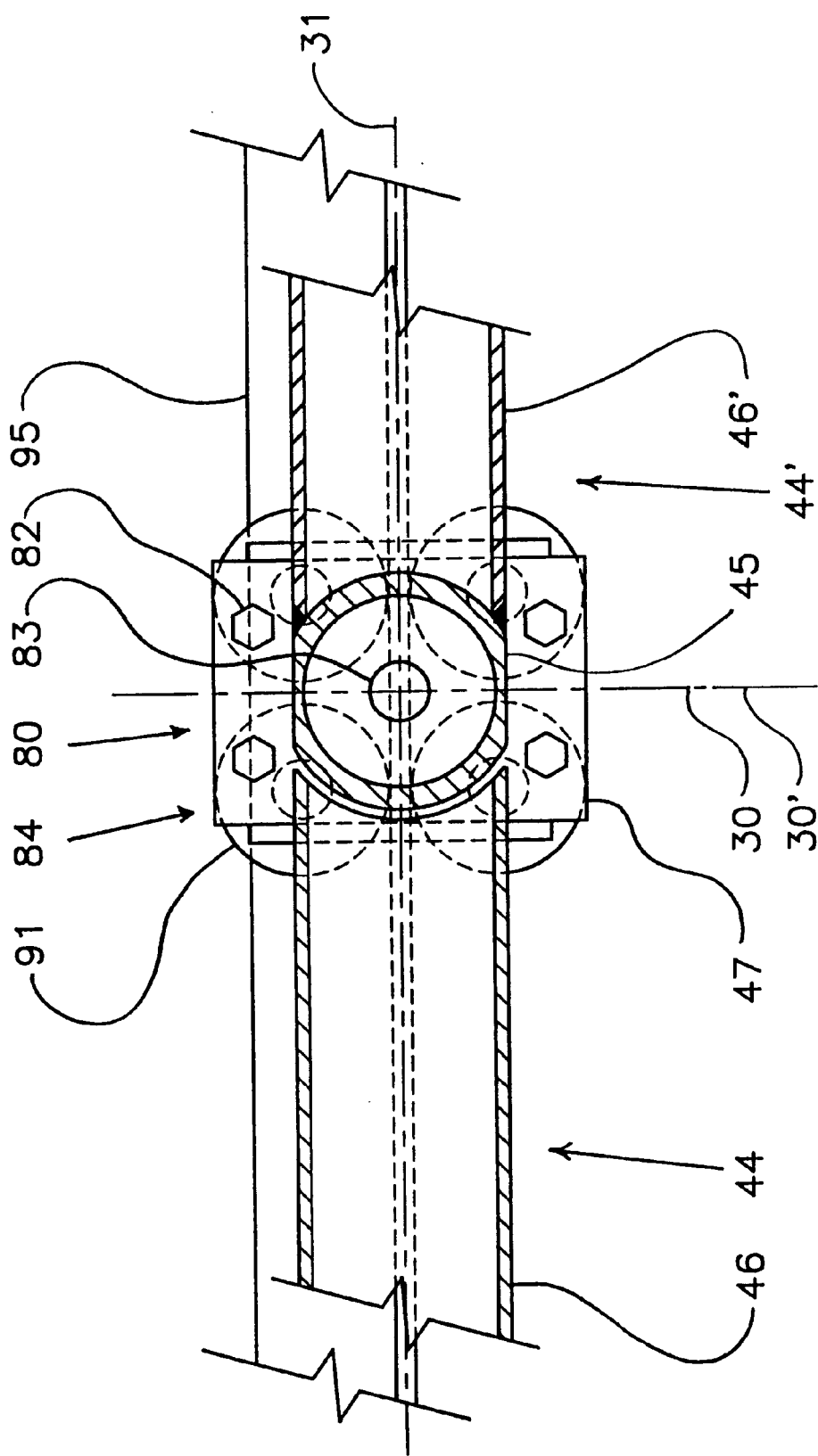
FIG. 11 is a cross-sectional plan view taken along line 11—11 of FIG. 9 showing matching drive surfaces of the adjacent platforms chassis and guiding means.

Each chassis 40 is also guided by its guide turntable 80, installed at the bottom of the chassis, at its center pivot location, which corresponds to the platform rotational axis (line 32 in FIGS. 7 and 9 at the intersection of orthogonal lines 30, 31 in FIG. 6) as shown in FIGS. 5, 9 and 11, with wheels 91 of the guide turntable 80 engaging a floor-mounted guide member in the form of an angle 95 represented in part as a dashed line in FIG. 3.

The relative rotations between the adjacent platforms 9, when entering or leaving the curved portions of travel path, or when the curvature of the travel path changes, are permitted by pivotally connecting one end of chassis 40 drive tube 44 to the opposite end of the adjacent chassis 9 drive tube 44 through the pivot pin 70 of one chassis, engaging the rod eye assembly 60 of the adjacent chassis, and by turntable 80 engaging the guide member 95 at the same vertical axis 30 and 30' (FIG. 9).

Figure 4:
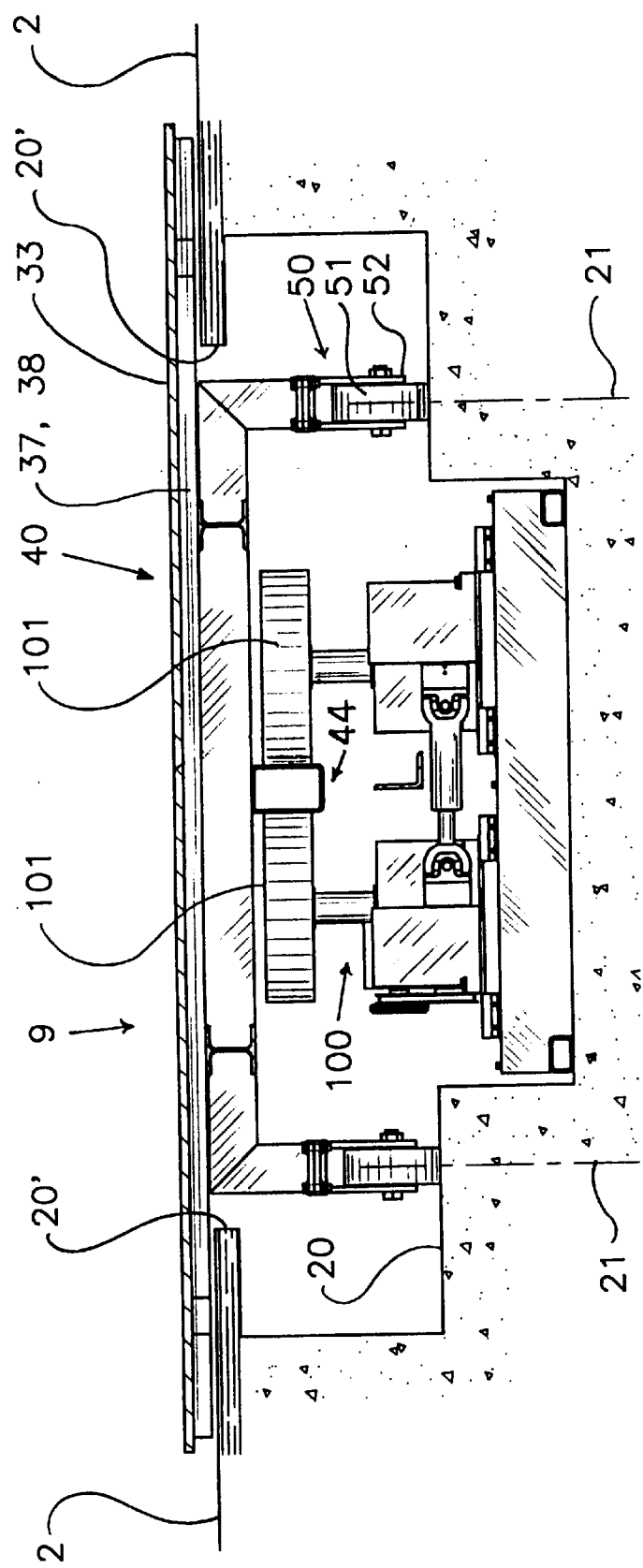
FIG. 4 is a cross-sectional view of the chain of movable platforms taken along the line 4—4 of FIG. 3, illustrating means for supporting and driving the platforms.

Each chassis 40 comprises a chassis cross member 41 extending generally transverse to the motion direction, rigidly connected to a chassis tie member 46 extending perpendicular to the cross member 41. The tie member 46 also functions as part of the drive tube 44. Due to the motion of the platforms and the horizontal pivoting geometry, the chassis 40 cross member 41 (FIG. 3) is perpendicular to the direction of travel at straight portions of travel only. During curved portions of travel, the cross member 41 rotates as shown for cross member 41' to an angular position with respect to the guide angle 95, which position is not parallel to the radius of curvature. This condition is compensated by using swivel mounts 52 for wheels 51 as shown in FIG. 4, so that the wheels remain perpendicular to the radius of curvature while rolling through the curved portions of the travel.

Note that the pivot axes 32, 32' (FIG. 7) do follow along the path indicated by 95 in FIG. 3. In addition, as shown in detail in FIGS. 9, 10, and 11, the guide wheels 91 engaging the guide angle 95 (see also FIG. 5) are mounted on the guide turntable 80 which keeps the opposing guide wheels 91 closely aligned with the radius of curvature of the travel path and thus nearly perpendicular to guide angle 95.

It should be noted that if the guide turntable 80 were not used, and the guide wheels 91 were fastened directly to the underside of chassis 40, the horizontal axis through the opposing guide wheel 91 bearings would be perpendicular to the guide angle 95 at the straight portions of travel only. When traveling along the curved portions of the track, the horizontal axis would not point to the center of curvature but would rotate with respect to the radius of curvature as described above for the chassis cross member 41'. In order to permit this rotation, gaps would have to be provided between the wheels 91 and guide angle 95. Mounting the wheels 91 on the guide turntable 80 eliminates the need for these gaps and provides smooth guiding. Double wheels 91 are used for the guide turntable 80 for tracking.

The chain of movable platforms 9 is driven by a traction drive machine 100 (FIGS. 3, 4, 12 and 13) through drive wheels 101 pressed against the chassis drive tube 44. The separate drive tubes 44, part of each chassis 40 structure, line up with the adjacent chassis drive tubes at the straight portions of the travel, so as to form a continuous straight fin below the platforms at the drive machine 100 location, for engagement by the drive wheels 101.

Further details of the preferred embodiment construction are given below.

FIG. 4 is a cross sectional view along the line 4—4 taken in FIG. 3 at the location of the traction drive machine 100. The platform floor 33 and floor framing 37, 38 cover the trench 20 and cantilever over the stationary floor 2 surfaces. The entire chassis 40, swivel caster assemblies 50, and all other components remain within the trench 20. The traction drive machine 100 is mounted in a pit within the trench 20 with its traction wheels 101 engaging the chassis 40 drive tube 44.

FIG. 5 is a cross-sectional view along the line 5—5 taken in FIG. 3 at the location of the guide turntable 80. The guide turntable 80 is mounted to the underside of the chassis 40 pivot tube 45 cap plate 47, with its pivot shaft 83 centered with the platform rotational axis, line 32 on FIG. 7. The guide wheels 91 engage the guide angle 95, mounted on the trench 20 floor, and keep each platform rotational axis, at line 32, accurately over the guide means 95 at all travel positions.

FIG. 6 shows the construction of a preferred form of platform 9 in the chain. The intersection of lines 30 and 31 defines the location of the platform center pivot and platform rotational axis 32. Platform floor 33 can be made out of plywood, steel, aluminum or stressed skin laminates. Access panels 34, 35, 36 are located to provide service access to pivot pin 70, adjacent platform rod eye assembly 60, guide turntable 80 and supporting swivel caster assemblies 50. Platform floor 33 and access panel 34, 35, 36 are bolted on the floor frames 37 and 38.

The floor frames 37 and 38 can be steel or aluminum weldments, shop fabricated as large as practical for ease of site installation. Since in a typical site installation the floor and floor frames 37, 38 cantilever over the adjacent stationary floor 2, as shown in FIG. 4, the floor frames 37 and 38 are made as shallow in height as reasonably possible, in order to reduce the step-up from the surrounding stationary floor 2 to platform floor 33. The floor frames 37, 38 are bolted on top of chassis 40.

For the wheelchair access platform 6, or where otherwise thin floor is required, the floor can be of sandwich construction with steel plates bonded to a wood or honeycomb core. If such stressed skin floor is used, which provides greater strength within the floor 33, the platform floor frames 37 and 38 may be eliminated and the floor 33 can be directly mounted on chassis 40. In this case additional framing members (not shown) may be added to chassis 40 to provide improved support for floor 33 and better load distribution. The strong thin stressed skin sandwich floor can cantilever over the stationary floor 2 and can be located to be very close to the stationary floor 2. Thus, the step-up from stationary floor 2 to platform floor 33 is minimized. In addition, this shallow step up can be beveled to further improve the wheelchair access.

Figure 7:
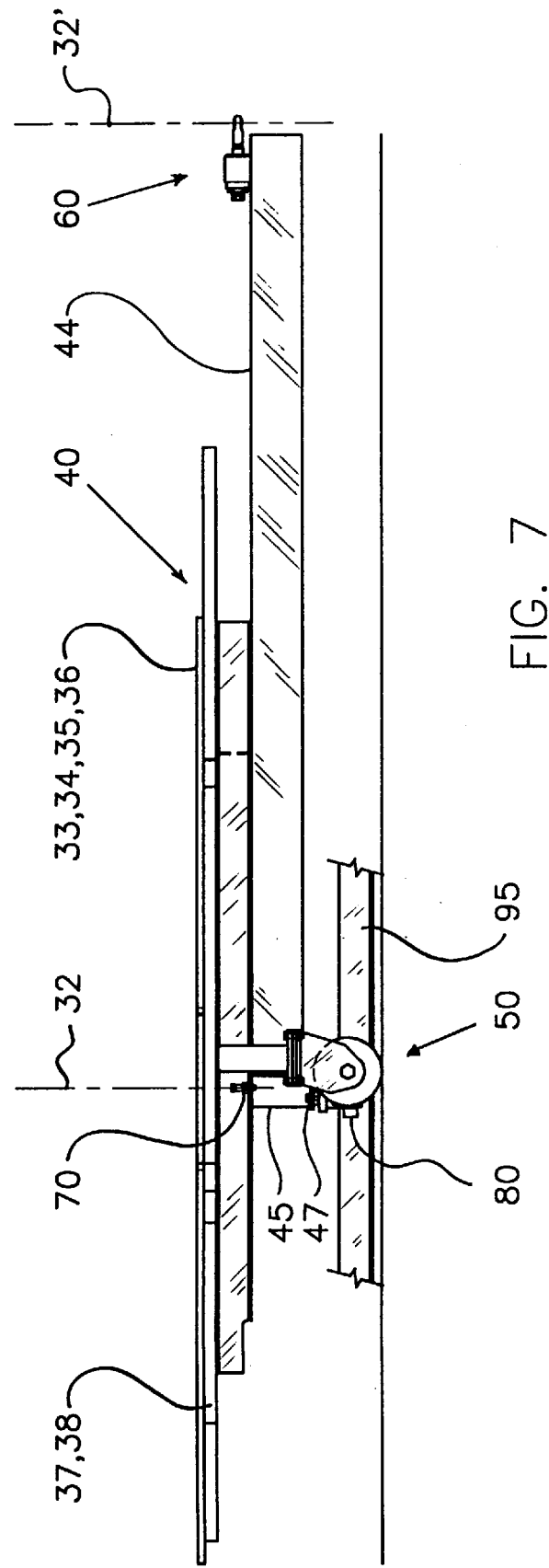
FIG. 7 is a side view of the fragmentary view of FIG. 6.

FIG. 7 is a side view of a typical platform as shown on FIG. 6. The line 32 indicates the location of the platform rotational axis at the intersection of lines 30 and 31 on FIG. 6. The line 32' indicates the location of the adjacent platform rotational axis at the intersection of lines 30' and 31 in FIG. 6. Platform floor 33 and access panels 34, 35, 36 are mounted on top of floor frames 37, 38, which in turn are mounted on chassis 40. The pivot pin 70 is mounted on top of chassis pivot tube 45 at the platform rotational axis 32 so as to connect to the adjacent platform rod eye assembly 60. The guide turntable 80 is mounted to the bottom of chassis 40 cap plate 47 at the platform rotational axis 32 so as to engage the fixed guide angle 95 on the trench 20 floor.

Figure 8:
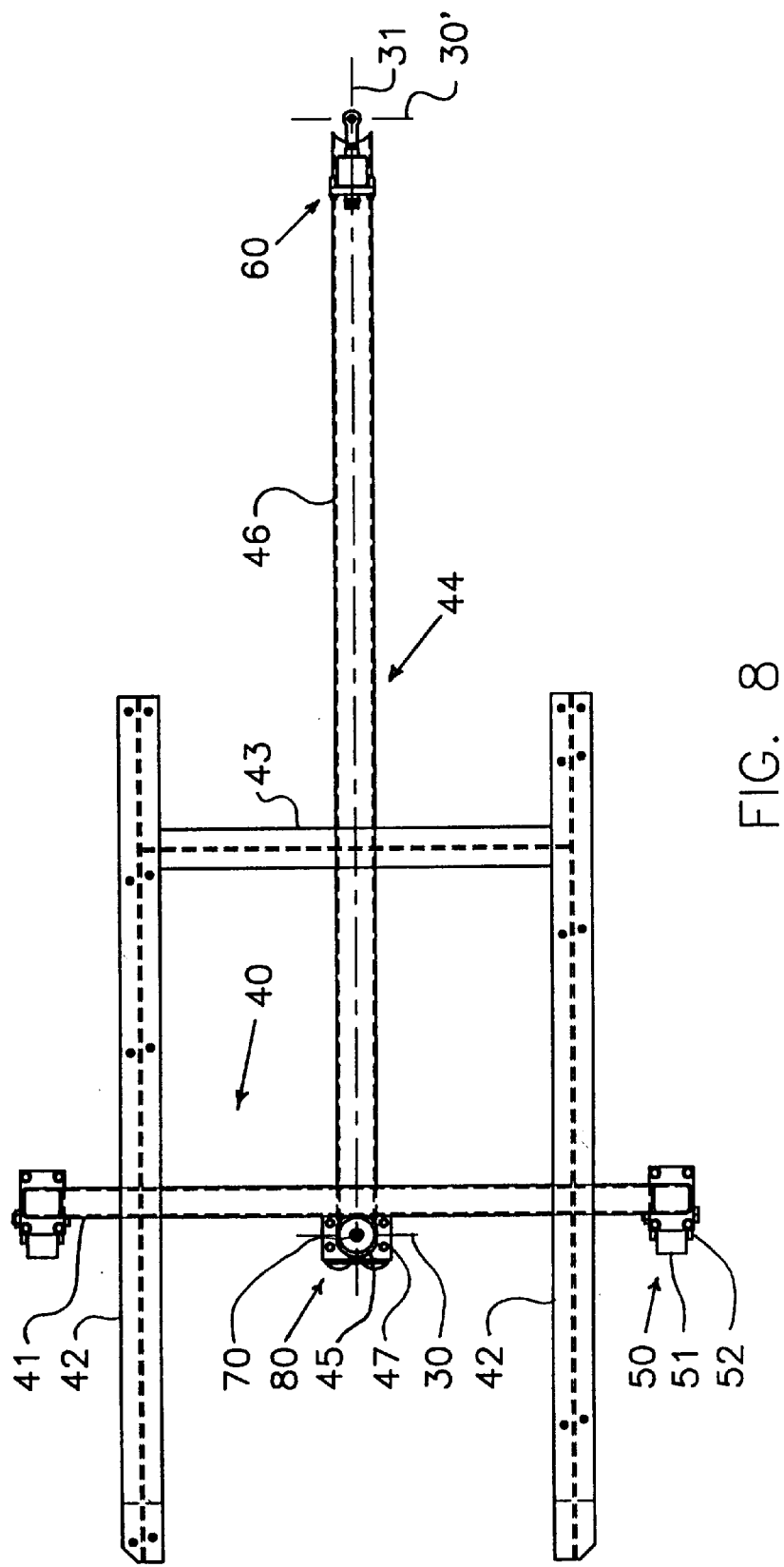
FIG. 8 is a plan view of one form of platform chassis for use in the chain of FIG. 1 showing the construction, guiding, interconnecting and drive wheels engagement member.

FIG. 8 is a plan view of chassis 40 which can be constructed out of steel or aluminum. Cross member 41 preferably is tubular in shape, supported by the two swivel caster assemblies 50, with elastomer tread wheels 51 mounted into swivel housings 52. If needed, additional supporting side members 42 are welded to the cross member 41, with their tops substantially level with the top of the cross member 41 and so that full structural continuity is maintained for members 41 and 42 at their intersections with each other. An additional support member 43 is welded between the side members 42 so as to form a rigid frame. The tubing member 46, part of drive tube 44, which also functions as the tie member between the adjacent chassis 40, is rigidly locked to cross member 41 in an orthogonal relationship.

Figure 10:
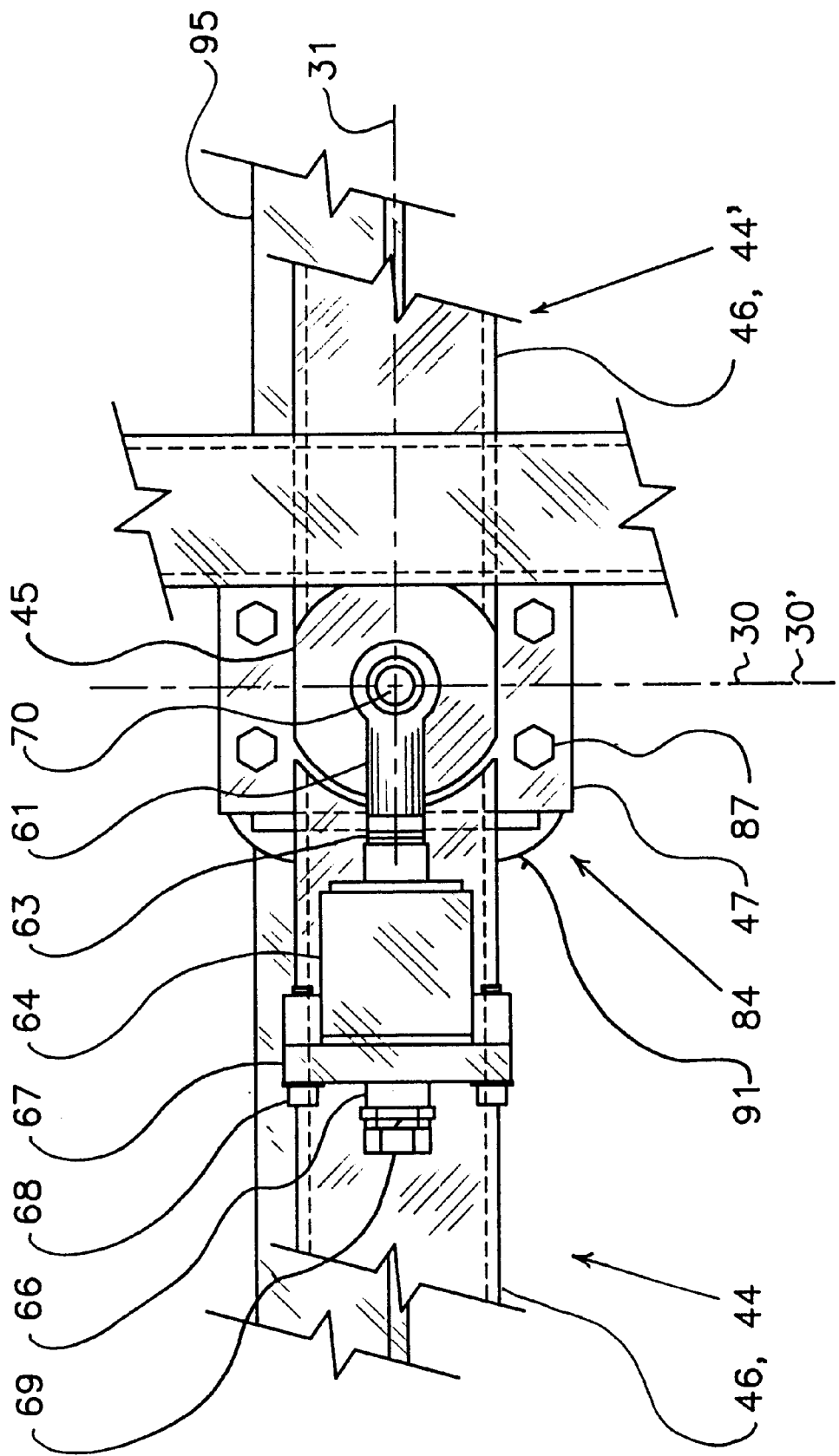
FIG. 10 is a plan view of part of the platform construction of FIG. 8 showing one form of connection between the adjacent platforms and guiding means.

Drive tube 44 may be a weldment consisting of rectangular tubing member 46, chassis pivot tube 45 and cap plate 47. As seen in FIGS. 10 and 11, the chassis pivot tube 45, at one end of the drive tube 44, has parallel sides, matching the vertical sides of the rectangular tubing member 46, thus forming smooth drive surfaces for the chain of movable platforms. The other end of the drive tube 44 is cut along a concave circular line 48 to rotate about the adjacent chassis pivot tube 45 with only narrow gaps at its vertical sides, so as to maintain continuity of the drive surfaces between the adjacent chassis drive tubes 44. The chassis pivot tube 45 is shown made out of round tubing with milled flat sides. This can be replaced by a rectangular pivot tube while still maintaining narrow gaps between the adjacent drive tubes 44 as required for drive wheels engagement continuity.

Referring back to FIG. 8, the drive tube 44 may be welded or bolted to the underside of members 41 and 42. Pivot pin 70 and guide turntable 80 are installed at the platform rotational axis end of the drive tube 44 and the rod eye assembly 60 is installed at the other end, (coinciding with the adjacent platform rotational axis 32' FIG. 7,) at the intersection of lines 30' and 31. Chassis 40 is supported on floor or on tracks by swivel caster assemblies 50 mounted to the ends of cross member 41 and by the rod eye assembly 60 engaging the pivot pin 70' of the adjacent chassis. Thus, a three point stable support, with guiding and drive surfaces at the sides of drive tube 44, is provided.

FIG. 9 is a side view showing the interconnection on top of adjacent chassis 40 and 40' and guide turntable 80, mounted on the bottom of chassis 40' cap plate 47, with guide wheels 91 engaging the guide means 95 installed on the trench 20 floor. FIG. 10 is a plan view of the same area showing additional interconnection details between the chassis 40 and 40'.

As shown in FIGS. 9 and 10, the interconnecting pivot pin 70 and the guide turntable pivot shaft 83, are centered and aligned with the coinciding platform rotational axes 32 and 32'. The chassis 40 and 40' are pivotally connected to each other through the rod eye assembly 60, with the rod eye 61 (part of rod eye assembly 60) mounted on chassis 40 drive tube 44 and connected to the top of chassis 40' pivot tube 45, through pivot pin 70. A spherical journal bearing 62 is installed into the rod eye 61, thus permitting horizontal relative rotations of chassis 40 with respect to chassis 40' about their coinciding axes 32 and 32'. The spherical bearing 62 also permits vertical rotation between the chassis 40 and 40' about the bearing so as to compensate for platform tilt due to the rolling surface possible irregularities and so as to maintain proper contact between the wheels 51 (FIG. 4) and their running surfaces without applying additional forces on chassis 40 and 40'.

The rod eye assembly housing 64 is mounted on top of chassis 40 drive tube 44. The rod eye mount 66, consisting of a tubular member and rectangular plate, welded to the outside of the tubular member, is installed into a housing 64 with elastomer washers 65 at both sides of the rod eye mount plate. A compression plate 67 is bolted on the end of housing 64, with cap screws 68, so as to compress the elastomer washers 65.

A purpose of this assembly construction is to permit controlled thermal expansion and contraction of the chain of movable platforms (specifically the chassis drive tubes 44 and 44', which are installed end to end in a closed loop) without inducing excessive stresses on the drive tubes 44 and 44'. Elastomer washers 65 are compressed by the plate 67 to the extent required so that no gaps would open between the washers 65, housing 64, rod eye mount 66 and compression plate 67 when normal driving forces are applied, but so that ample additional compressibility in the washers 65 would permit thermal expansion and contraction without causing excessive additional forces or gaps.

The rod eye 60 is fastened to the rod eye mount 66 by rod eye cap screw 69, inserted through the rod eye mount 66 tubular member and threaded into the rod eye 61. Spacer washers 63 are used between the rod eye mount 66 and rod eye 61 for length adjustment during installation, as required.

The guide turntable 80 is shown in FIG. 9 and in FIG. 11, a plan cross-sectioned view taken along the line 11—11 in FIG.9. The guide turntable 80 is mounted to the underside of chassis 40' by bolting its base plate 81 to the underside of chassis 40' cap plate 47 with cap screws 82. The pivot shaft 83 is either threaded or welded into the base plate 81. The turntable wheel mount 84 is a weldment consisting of top plate 85 and wheel mounting bars 86. The wheel mount 84 is installed to the base plate 81 pivot shaft 83, and is held in place by washer 87 and nut 88. The rotation contact surfaces of the turntable wheel mount 84 are separated from the surfaces of the base plate 81, pivot shaft 83, and washer 87 through the thrust bearings 89 and journal bearing 90, made of metallic or non-metallic materials which minimize the friction without requiring maintenance lubrications. The guide wheels 91, with appropriate bearings, are mounted to the underside of the turntable wheel mount 84 with shoulder cap screws 92.

Figure 13:
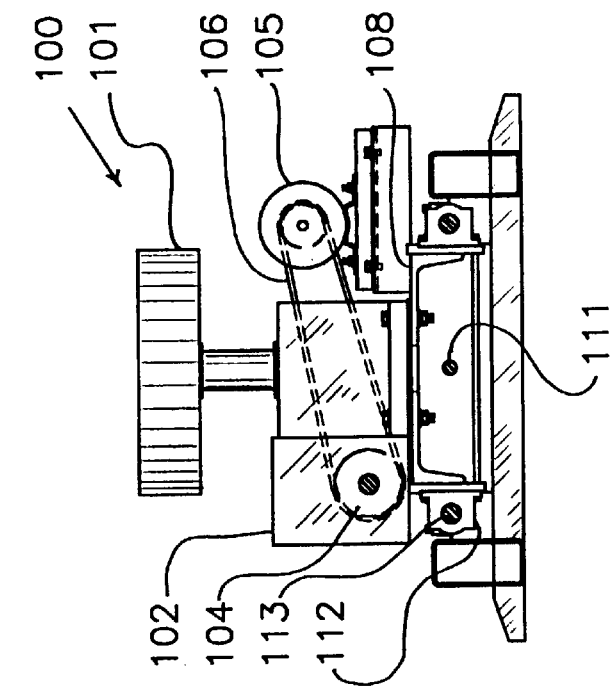
FIG. 13 is a cross-sectional view taken along line 13—13 of FIG. 12.
Figure 12:
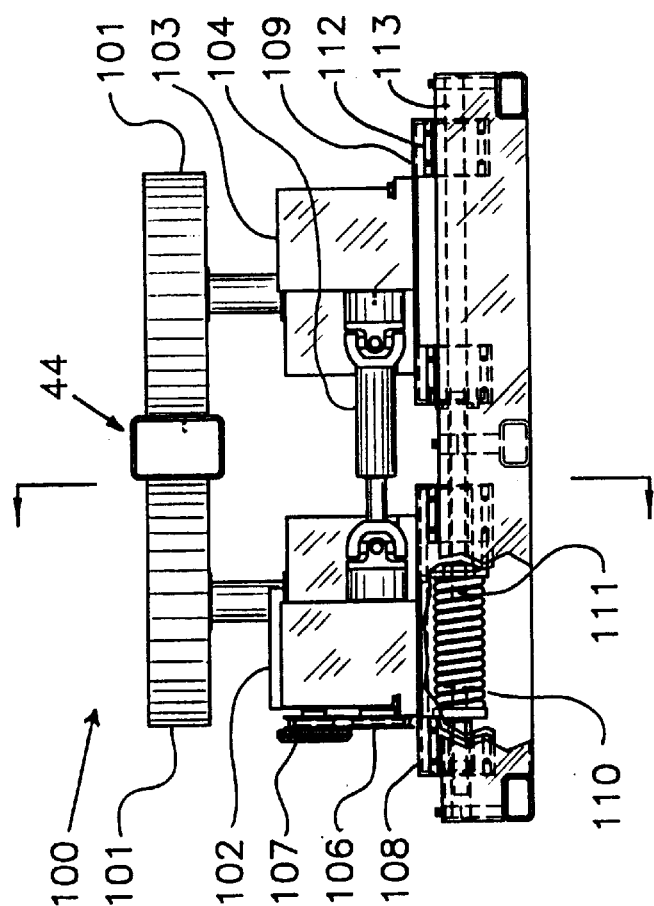
FIG. 12 is a side view of one form of a traction drive machine for use with the chain of platforms of FIG. 1.

FIG. 12 is a side view of the traction drive machine 100 and FIG. 13 is a cross sectional view taken along line 13—13 of FIG. 12. The chain of movable platforms is driven by rubber tired traction wheels 101 pressed against the chassis drive tubes 44 by compression spring 110, pulling a sliding base 109 toward an opposed sliding base 108 through a tension rod 111, which is bolted to sliding base 109 and slidingly connected to the sliding base 108. The traction wheels 101 are driven by gear reducers 102 and 103 mounted on sliding bases 108 and 109 respectively. The gear reducer 102 is driven by motor 105 through belt transmission 106. A hydraulic coupling 107 may be installed on the motor 105 drive shaft for providing smooth starting. A gear reducer 103 is driven by gear reducer 102 through a universal joint shaft 104. The universal joint shaft 104 is telescoping at one end so as to permit relative motion of sliding bases 108 and 109 for compressing the wheels 101 against the drive tubes 44.

Each sliding base can be supported by four linear bearings 112, sliding on bearing rods 113 which rods are rigidly fastened to a fixed base 114.

It should be noted that while the sliding bases 108, 109 can be compressed towards each other by the spring 110, both sliding bases together, with all mounted components, can slide together in one or the other direction to compensate for the drive tube lateral movements, without loosing traction pressure on wheels 101.

While a particular traction drive 100 is described herein, modifications and other types of traction drives are possible and will be evident to one skilled in the art.

An hydraulic motor can be used instead of the electric motor 105 shown. Independent motors, either electric or hydraulic, can be used for driving the gear reducers 102 and 103 separately. The shaft 104 could then be eliminated. Slow speed hydraulic motors can be used for directly driving the wheels 101, thus eliminating the gear reducers 102, 103, shaft 104, motor 105, and belt transmission 106. Other alternates are also possible.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A construction for moving people or objects along a closed path, comprising:
   a) a plurality of platforms each supported on movable means, each of a plurality of platforms comprising a tie, member extending generally in line in the direction of the closed path,
   b) means for pivotably connecting together pairs of adjacent platforms such that the connected platforms are chained together to form a closed loop extending over the closed path and the connected platforms can swivel with respect to one another,
   c) means for guiding the movable means of the platforms along the closed path,
   d) means for driving at least one of the platforms along the predetermined path causing the chained platforms to follow along the closed path, said means for driving comprising traction wheels engaging opposite sides of a tie member.

2. The construction according to claim 1, wherein the movable means comprises separate wheels for each platform, and the means for guiding comprises a fixed rail configured to follow the closed path.

3. The construction according to claim 1, wherein the driving means comprises a fixed member mounted underneath and supported by each platform, and stationary traction drive means for engaging each fixed member as its supporting platform moves over the traction drive means.

4. Apparatus for moving people or objects along a closed path over a fixed substrate, comprising:
 a) a plurality of discrete platforms each supported on movable means, each of a plurality of platforms comprising a tie member extending generally in line in the direction of the closed path,
 b) means for pivotably connecting together pairs of adjacent platforms such that the connected platforms are chained together to form a closed loop extending over the closed path and the connected platforms can swivel with respect to one another,
 c) means fixed to the substrate for guiding the movable means of the platforms along the closed path,
 d) means fixed to the substrate for driving the platforms when a platform passes adjacent to the fixed means for driving, said means for driving comprising traction wheels engaging opposite sides of a tie member of the passing platform.

5. The apparatus according to claim 4, further comprising a trench, said movable means moving within the trench, said platforms being configured to cover the trench while the platforms move along the closed path.

6. The apparatus according to claim 4, wherein each platform comprises a circular section nesting with a circular section of the adjacent platform, said nesting circular sections being sufficiently closely spaced and sufficiently extended such that, while the platforms move along the closed path, substantially no spaces are formed that could catch or trap an object.

7. Apparatus for moving people or objects along a closed path over a fixed substrate, comprising:
 a) a plurality of discrete platforms each supported on movable means,
 b) a cross member and a structural tie member supporting each platform and extending generally orthogonal to each other,
 c) means for pivotably connecting together pairs of adjacent platforms such that the connected platforms are chained together to form a closed loop extending over the closed path and the connected platforms can swivel with respect to one another,
 d) means fixed to the substrate for guiding the movable means of the platforms along the closed path,
 e) means fixed to the substrate for driving the platforms when a platform passes adjacent to the fixed means for driving.

8. The apparatus according to claim 7, further comprising a rotatable bearing at the intersection of the cross and tie members under each platform allowing the tie member to rotate about a vertical pivot axis with respect to the platform.

9. The apparatus according to claim 8, wherein the rotatable bearing comprises a rotatable guide turntable mounted underneath the platform and having a rotatable axis concentric with the pivot axis.

10. The apparatus according to claim 9, wherein said guide turntable comprises guide wheels engaging opposite sides of the means for guiding the movable means.

11. The apparatus according to claim 10, wherein the movable means comprise swivel caster assemblies.

12. The apparatus according to claim 8, wherein the rotatable assembly on each platform comprises a rod-eye assembly mounted on one end of the tie member and cooperating with a pivot pin connected to the platform, the other end of the tie member being connected to the rod-eye assembly on the adjacent platform.

13. The apparatus according to claim 12, wherein the rod-eye assembly comprises support means allowing the assembly to compensate for expansion and contraction of parts of the apparatus.

14. The apparatus according to claim 8, wherein the rotatable bearing comprises means allowing vertical movement to compensate for irregularities in the substrate.

15. The apparatus according to claim 8, further comprising a drive tube connected to the tie member on each platform.

16. The apparatus according to claim 15, wherein the drive means comprises means for engaging and driving the drive tube.

17. The apparatus according to claim 16, wherein the drive means comprises traction drive for the drive tube.

18. The apparatus according to claim 16, further comprising sliding means for supporting the traction drive for allowing transverse motion relative to the closed path.

19. A construction for moving people or objects along a closed path, comprising:
 a) a plurality of platforms each supported on movable means,
 b) means for pivotably connecting together pairs of adjacent platforms such that the connected platforms are chained together to form a closed loop extending over the closed path and the connected platforms can swivel with respect to one another, the means for pivotably connecting comprising a tie member extending generally in line in the direction of the closed path and pivotably connected at one end to a platform and a cross member extending generally transverse to the tie member and connected to the tie member at its other end,
 c) means for guiding the movable means of the platforms along the closed path,
 d) means for driving at least one of the platforms along the predetermined path causing the chained platforms to follow along the closed path.

20. The construction according to claim 19, further comprising a rotatable bearing connecting the cross member to the other end of the tie member.

21. A restaurant comprising;
 I. a floor and a viewing area, and
 II. apparatus for moving people along an irregular closed path over the restaurant floor and adjacent to the viewing area, said apparatus comprising:
  a) a plurality of discrete platforms each supported on movable means, each of a plurality of platforms comprising a tie member extending generally in line in the direction of the closed path,
  b) means for pivotably connecting together pairs of adjacent platforms such that the connected platforms are chained together to form a closed loop extending over the closed path and the connected platforms can swivel with respect to one another,
  c) means fixed to the restaurant floor for guiding the movable means of the platforms along the closed path,
  d) means fixed to the restaurant floor for driving the platforms when a platform passes over the means for driving, said means for driving comprising traction wheels engaging opposite sides of a tie member of the passing platform.

22. A restaurant as claimed in claim 21, wherein the means for guiding comprises a rail.

23. A restaurant as claimed in claim 22, further comprising a structural member supporting each platform and interconnecting adjacent platforms via means allowing both horizontal and vertical movement, said structural member comprising means coupled to the means for driving for moving the platform relative to the means for driving.

24. A restaurant as claimed in claim 21 wherein each platform is supported at three points, two of the points comprising wheels and the third point comprising a pivot connection to the adjacent platform.

25. A restaurant as claimed in claim 21, further comprising exterior windows between the platforms and the viewing area.

26. A restaurant as claimed in claim 21, wherein the viewing area is a themed environment.

27. Apparatus for moving people or objects along a closed path over a fixed substrate, comprising:
  a) a plurality of discrete platforms each supported on movable means,
  b) means for pivotably connecting together pairs of adjacent platforms such that the connected platforms are chained together to form a closed loop extending over the closed path and the connected platforms can swivel with respect to one another,
  c) means fixed to the substrate for guiding the movable means of the platforms along the closed path,
  d) means fixed to the substrate for driving the platforms when a platform passes adjacent to the fixed means for driving,
  e) the means for pivotably connecting together adjacent platforms comprising support means functioning to compensate for changes in the length of the chained platforms.

28. The apparatus according to claim 27, further comprising a cross member and a structural tie member supporting each platform and extending generally orthogonal to each other.

29. The apparatus according to claim 27, wherein the support means functioning to compensate for changes in the length of the chained platforms comprises elastomeric means connecting the pivotably connecting means to one of the platforms.

30. The apparatus according to claim 28, wherein the means for pivotably connecting together adjacent platforms comprises a rod-eye assembly mounted on one end of a tie member and cooperating with a pivot pin connected to a platform, the other end of the tie member being connected to the rod-eye assembly on an adjacent platform.

* * * * *